(12) United States Patent
Lanfield et al.

(10) Patent No.: US 7,254,657 B1
(45) Date of Patent: Aug. 7, 2007

(54) DUAL MODE CAPABILITY FOR SYSTEM BUS

(75) Inventors: Jason D. Lanfield, Forest Lake, MN (US); Chad M. Sonmore, Blaine, MN (US); David P. Williams, Mounds View, MN (US); Stephen Sutter, Osseo, MN (US)

(73) Assignee: Unisys Corporation, Blue Bell, PA (US)

( * ) Notice: Subject to any disclaimer, the term of this patent is extended or adjusted under 35 U.S.C. 154(b) by 196 days.

(21) Appl. No.: 11/118,051

(22) Filed: Apr. 29, 2005

(51) Int. Cl.
*G06F 1/00* (2006.01)
(52) U.S. Cl. .................. 710/105; 710/306; 710/307; 710/309; 710/310
(58) Field of Classification Search ........ 710/104–105, 710/305–307, 309–317, 58–61; 713/500–502
See application file for complete search history.

(56) References Cited

U.S. PATENT DOCUMENTS

| | | | | |
|---|---|---|---|---|
| 5,208,838 A | * | 5/1993 | Wendell et al. ............. 375/354 |
| 5,263,172 A | * | 11/1993 | Olnowich ................... 710/307 |
| 5,537,660 A | * | 7/1996 | Bond et al. .................. 710/58 |
| 6,069,897 A | * | 5/2000 | Perlman et al. ............. 370/420 |
| 6,148,347 A | * | 11/2000 | Finch et al. .................. 710/14 |
| 7,089,412 B2 | * | 8/2006 | Chen ............................. 713/2 |

* cited by examiner

*Primary Examiner*—Khanh Dang
*Assistant Examiner*—Raymond N Phan
(74) *Attorney, Agent, or Firm*—Beth L. McMahon; Charles A. Johnson; Crawford Maunu, PLLC

(57) ABSTRACT

A computing system with a mode-selectable bus interface. In one embodiment, the computing system includes a system bus, a processor coupled to the bus via an interface unit, and a controller coupled to the bus. The system bus implements one of a first and a second system bus protocols. The interface unit is compatible with the first system bus protocol in a first selectable mode and the second system bus protocol in a second selectable mode, and the controller is compatible with one of the system bus protocols. A mode register is coupled to the interface unit, and the interface unit selects the first mode responsive to a first value of the mode register and selects the second mode responsive to a second value of the mode register. A scan controller is coupled to the mode register for scanning a value into the mode register.

21 Claims, 6 Drawing Sheets

DUAL MODE CAPABILITY FOR SYSTEM BUS

FIELD OF THE INVENTION

The present disclosure relates to protocols for a system bus of a computer system.

BACKGROUND OF THE INVENTION

The development of a computer system requires significant engineering effort over a development cycle that may span several years for systems having multiple processors. Computer systems generally include several types of integrated circuits, such as processors, memory controllers, and input/output controllers. To reduce the cost and schedule for developing and manufacturing a computer system, certain integrated circuits of the computer system may be purchased from an external supplier. The remaining integrated circuits that are not purchased may be developed by one or more design teams. The development effort for a computer system may be divided into a design phase that precedes initial production of the non-purchased integrated circuits and a debugging/integration phase that uses prototype computer systems built using the purchased integrated circuits and the initial production of the non-purchased integrated circuits. Quickly completing the design phase and the debugging phase can be crucial for the successful acceptance of a computer system in the computer market.

A challenge during the design phase is the management of the development schedule. Ideally, the design phase concludes with the various integrated circuits becoming simultaneously available because typically the prototype computer systems cannot be built until all integrated circuits are available. However, the development schedules for the non-purchased integrated circuits and the availability of samples of purchased integrated circuits can be somewhat unpredictable, such that one of the integrated circuits is likely to be delayed. Management of the design phase schedule can be challenging due to the unpredictable schedules for the individual integrated circuits and the difficulty in coordinating between the project design teams for the integrated circuits and the external suppliers.

The debugging of one integrated circuit during the debugging phase may be interrelated with the debugging of the other integrated circuits, and this interrelation can delay the completion of the debugging phase. For example, a significant defect may be discovered in one integrated circuit, and the defect may limit the functions that can be tested, thereby delaying the discovery of other potential defects until the defect is fixed. Fixing each defect may require several months in the production of a modified integrated circuit. The serialized discovery of the defects in each integrated circuit can delay the completion of the debugging phase and ultimately delay delivery of the product to the market.

The present invention may address one or more of the above issues.

SUMMARY OF THE INVENTION

The present invention provides various embodiments of a computing system with a mode-selectable bus interface. In one embodiment, the computing system includes a system bus, a processor coupled to the bus via an interface unit, and a controller coupled to the bus. The system bus implements one of a first and a second system bus protocols. The interface unit is compatible with the first system bus protocol in a first selectable mode and the second system bus protocol in a second selectable mode, and the controller is compatible with one of the system bus protocols. A mode register is coupled to the interface unit, and the interface unit selects the first mode responsive to a first value of the mode register and selects the second mode responsive to a second value of the mode register. A scan controller is coupled to the mode register for scanning a value into the mode register.

In another embodiment, a method is provided for transferring data in a computer system. The method includes scanning a value into a mode register in an interface unit of a processor arrangement. The scanned value is one of a first value and a second value. A memory read is issued to a system bus by the interface unit, and the interface unit receives from the system bus a completion response for the memory read. The completion response includes a source identifier and data of a memory location addressed by the memory read. The parity of the source identifier is checked by the interface unit using one of a first parity check and a second parity check, and the parity check is selected in response to the value in the mode register. The interface unit compares, in response to a first value in the mode register, the source identifier in the completion response to a source identifier in an acknowledgement response associated with the memory read. Acceptance of the data from the completion response is conditioned on the comparison. The interface unit compares, in response to a second value in the mode register, the source identifier in the completion response to a source identifier in the memory read; and acceptance of the data from the completion response is conditioned on this comparison.

In another embodiment, an arrangement is provided for transferring data in a computer system. The arrangement includes means for scanning a value into a mode register, wherein the value is one of a first value and a second value; means for issuing a memory read to a system bus of the computer system; means for receiving from the system bus, a completion response for the memory read, the completion response including a source identifier and data of a memory location addressed by the memory read; means for checking parity of the source identifier using one of a first parity check and a second parity check, the one of the parity checks selected in response to the value in the mode register; means for comparing, in response to a first value in the mode register, the source identifier in the completion response to a source identifier in an acknowledgement response associated with the memory read and conditioning acceptance of the data from the completion response in response to the comparison; and means for comparing, in response to a second value in the mode register, the source identifier in the completion response to a source identifier in the memory read and conditioning acceptance of the data from the completion response in response to the comparison.

Other aspects and advantages of the invention will become apparent upon review of the Detailed Description and upon reference to the drawings in which:

DETAILED DESCRIPTION

Figure 1A:
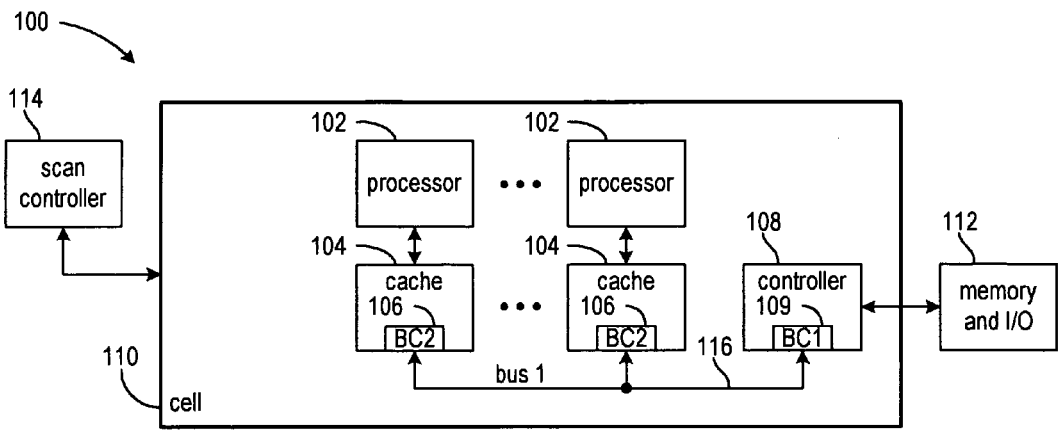
FIG. 1A is a block diagram of a computer system with processors and caches that each includes an interface unit using a first mode in accordance with various embodiments of the invention.

FIG. 1A is a block diagram of a computer system 100 with processors 102 and caches 104 that each include an interface unit 106 using a first mode in accordance with various embodiments of the invention. The processors 102 and caches 104 may initially be tested with circuits, including memory and input/output controller 108 and memory and input/output resources 112, from a previously released product. Because the controller 108 and resources 112 may already be debugged in a previously released product, the computer system 100 may have an accelerated debugging phase, which may allow a rapid release of the computer system 100 as a product.

A computer system may include one multiprocessor cell 110, or a number of cells 110 that are connected to a memory and input/output resources 112. Access to the memory and input/output resources 112 by the cell 110 is provided by memory and input/output controller 108. Controller 108 provides coherent access to the memory resources of resources 112 and may include an interface function 109 that is only compatible with one system bus protocol corresponding to system bus 116.

A scan controller 114 is coupled to each cell 110 using one or more serial scan chains. For a computer system including multiple cells 110, each cell 110 typically has an independent scan chain linking the cell 110 to the scan controller 114 for the computer system. Each processor 102, each cache 104, and the controller 108 for the cell 110 may be serially connected on a serial scan chain that begins at the scan controller 114, successively passes through each of circuits 102, 104, and 108, and ends at the scan controller 114. The scan controller 114 may supply write data by serially shifting the data through the serial scan chain to one of circuits 102, 104, and 108, and the scan controller 114 may receive read data from one of circuits 102, 104 and 108 by serially shifting the data through the serial scan chain. Within each circuit 102, 104, and 108, serially shifted data may be directed through various registers or chains of registers under the control of the scan controller 114, and these registers a referred to as scannable registers. Generally, any of these scannable registers or any storage bit of these scannable registers may be accessed and modified under the control of the scan controller 114. An example serial scan chain protocol is IEEE 1149.1 JTAG scan.

During initialization of a computer system 100, the scan controller 114 may query and initialize certain scannable registers of circuits 102, 104, and/or 108. For example, the scan controller 114 may read a device identification code of controller 108 from a scannable register of controller 108 and determine that controller 108 has a type that supports only a bus protocol corresponding to system bus 116. In contrast, the bus interface units 106 of each cache 104 may support the protocol of either the system bus 116 or another system bus, depending on the value of a scannable mode register of the cache 104. The initialization of each cache 104 by the scan controller 114 may include setting the scannable mode register to a value corresponding to the system bus 116. By setting the scannable mode register of a cache 104 to a value corresponding to the system bus 116, the cache 104 may be able to communicate with the controller 108. When the scannable mode register has a value corresponding to the other system bus supported by the cache 104, the cache 104 and the controller 108 may not be able to communicate due to differences in the protocols between the system bus 116 and the other system bus.

It will be appreciated that the scannable mode register may include several storage bits that are distributed along one or more scan chains of the cache 104 and bus interface unit 106, such as a storage bit controlling each protocol feature that is different between the system bus 116 and the other system bus supported by the bus interface unit 106. Generally, the scannable mode register and the logic that handles the differences in protocols between the busses are located within the bus interface unit 106.

Figure 1B:
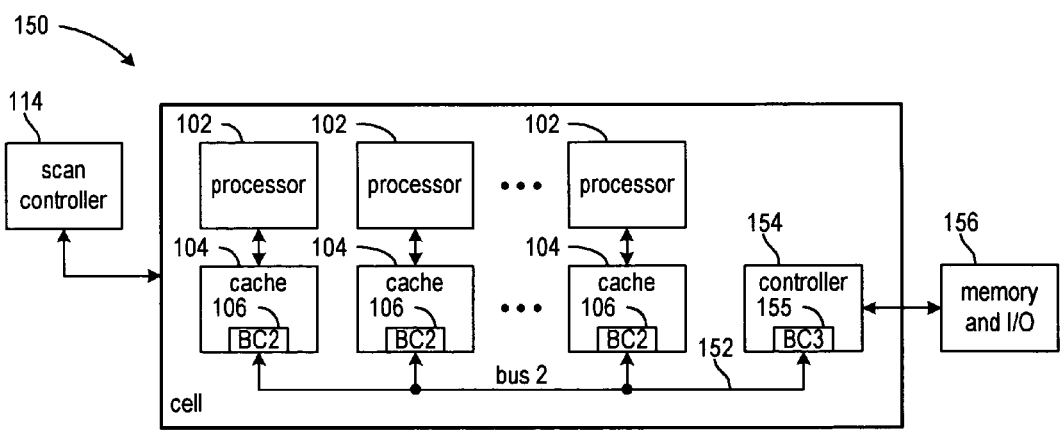
FIG. 1B is a block diagram of a computer system with processors and caches that each includes an interface unit using a second mode in accordance with various embodiments of the invention.

FIG. 1B is a block diagram of a computer system 150 with processors 102 and caches 104 that each include an interface unit 106 using a second mode in accordance with various embodiments of the invention. The processors 102 and caches 104 shown in FIG. 1B are the same type as the processors 102 and caches 104 shown in FIG. 1A, but the system bus 152 of computer system 150 is different from the system bus 116 of computer system 100 and the controller 154 and resources 156 of computer system 150 are different from the controller 108 and resources 112 of computer system 100. The development of computer system 150 may begin after computer system 100 is released to the market as a product.

Because the processors 102 and caches 104 may be previously debugged using computer system 100 of FIG. 1A, the processors 102 and caches 104 are not likely to have any defects limiting the testing of memory and input/output controller 154 and memory and input/output resources 156 of computer system 150. Thus, the debugging of computer system 150 is likely dependent only on the debugging of the new memory and input/output subsystem including circuits 154 and 156. The debugging of computer system 150 which focuses on circuits 154 and 156 may lead to an accelerated debugging phase for computer system 150, allowing the rapid release of computer system 150 as a product. It will be appreciated that certain functions of the bus interface unit 106 of the cache 104 that are related to the handling of the system bus 152 may not be fully tested in the computer system 100 of FIG. 1A. Controller 154 may include an interface function 155 that is only compatible with one system bus protocol corresponding to system bus 152.

During initialization of computer system 150, scan controller 114 may read a device identification code of controller 154 and determine that controller 154 supports only a bus protocol corresponding to system bus 152. Scan controller 114 may subsequently initialize the scannable mode register of each cache 104 to a value corresponding to the system bus 152. Thus, the same scan controller 114 may be used in either the computer system 100 of FIG. 1A or the computer system 150 of FIG. 1B, and the scan controller 114 may automatically determine whether a computer system uses system bus 116 of FIG. 1A or system bus 152 of FIG. 1B from the device identification code of controllers 108 and 154 respectively. In addition, the scan controller 114 may automatically initialize the scannable mode register of caches 104 and/or processors 102 with either one value for a first mode for a computer system 100 with system bus 116, or another value for a second mode for a computer system 150 with system bus 152.

It will be appreciated that the scan controller 114 of FIG. 1A may not need to be identical to the scan controller 114 of FIG. 1B. Furthermore, determining whether a computer system includes system bus 116 or system bus 152 may be accomplished by approaches other than determining the device identification code of the respective controller 108 or 154. For example, an alternative approach may use different scan controllers 114 for computer systems 100 and 150, with each scan controller 114 providing a respective fixed value as appropriate for each scannable mode register.

System bus 152 of FIG. 1B is different than system bus 116 of FIG. 1A. For example, system bus 152 may have a higher data bandwidth than system bus 116 due to a wider data bus and/or a higher operating frequency. In various embodiments, system bus 152 has more than twice the data bandwidth of system bus 116 by having twice the data bus width and a somewhat higher operating frequency. A higher data bandwidth for system bus 152 as compared to system bus 116 may allow system bus 152 to support the bandwidth requirements of more processors 102 and caches 104 than are supported by system bus 116. For example, system bus 116 may support two processor arrangements each including a processor 102 and a cache 104, while system bus 152 may support four processor arrangements. To effectively utilize a particular amount of system bus bandwidth, a cache 104 may need to have a number of transactions simultaneously in process, with each transaction having a unique associated source identifier. Thus, system bus 152 may support more source identifiers for pending transactions than system bus 116 in various embodiments of the invention.

Figure 2A:
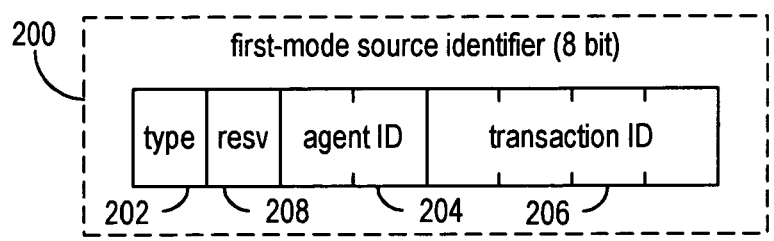
FIG. 2A is a layout diagram for the fields of an example source identifier in the first mode in accordance with various embodiments of the invention.

FIG. 2A is a layout diagram for the fields of an example of source identifier 200 in the first mode in accordance with various embodiments of the invention. A source identifier 200 is typically used to match the completion response for a transaction request with the originator of the transaction request. For example, a source identifier may be assigned to a memory read that requests the data for a specified location in memory. Later, a completion response for the memory read may include the data for the specified location in memory and the source identifier. The originator of the memory read may accept the data from the completion response based on recognizing the source identifier.

Generally, source identifiers are used on system busses that have certain transactions, such as a memory read, where the completion response for a transaction is separated, or split, from the request for the transaction. Such split transaction busses generally support having several split transactions simultaneously in progress. Each split transaction of several split transactions simultaneously in progress should have a unique source identifier. After delivery of a completion response, the corresponding source identifier may be reused in another transaction request.

The originator of a split transaction is made aware of the assigned source identifier. In one embodiment, the originator of a split transaction generates and retains the source identifier. In another embodiment, the source identifier is generated by the split transaction's destination, such as a memory and input/output controller, the source identifier is given to the originator of the split transaction on acceptance of the transaction request by the destination, and the provided source identifier is retained by the originator. Generation of the source identifier by the originator for certain transactions and generation of the source identifier by the destination for other transactions are used in an alternative embodiment. Generally, the generator of a source identifier is responsible for ensuring that a generated source identifier is unique, including preventing the issuance of a transaction request when no free source identifiers are currently available.

The fields of the source identifier 200 include a type field 202, a field 204 for an agent identifier, a field 206 for a transaction identifier, and a reserved field 208. The type field 202 may be a one bit field that indicates the class of the originator of a transaction request. One value for the type field 202 may indicate that a controller for memory and input/output is the originator of the transaction request on the system bus. Another value for the type field 202 may indicate that one of the caches is the originator of the transaction request on the system bus, and the agent identifier field 204 may further identify which of these caches is the originator of the transaction request. Each controller and cache may have several split transactions simultaneously in progress. The transaction identifier field 206 may distinguish the several split transactions simultaneously in progress from a particular controller or cache. The reserved field 208 may be reserved.

Figure 2B:
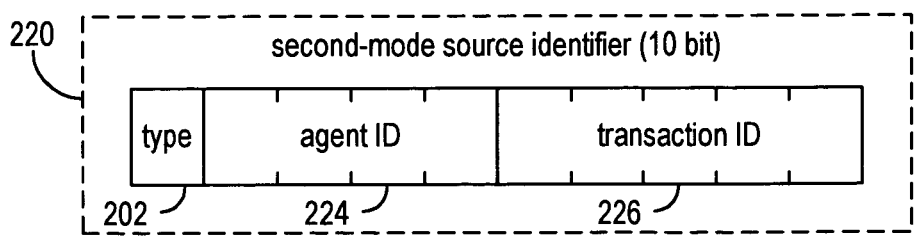
FIG. 2B is a layout diagram for the fields of an example source identifier in the second mode in accordance with various embodiments of the invention.

FIG. 2B is a layout diagram for the fields of an example of source identifier 220 in the second mode in accordance with various embodiments of the invention. The source identifier 220 may provide more unique source identifiers than the source identifier 200 of FIG. 2A by expanding the agent identifier field 224 to four bits from two bits, expanding the transaction identifier field 226 to five bits from four bits, and eliminating the reserved field 208 of FIG. 2A.

In various embodiments, source identifier 220 of FIG. 2B includes two more bits than source identifier 200 of FIG. 2A. In one embodiment, each bit of a source identifier 200 or 220 may be carried on a signal of a respective system bus, and the ten signals for source identifier 220 for one system bus may correspond to the eight signals for source identifier 200 for another system bus plus two additional signals. The lower four bits of source identifier 200, which includes transaction identifier 206, may correspond to the lower four bits of source identifier 220, which includes the lower four bits of agent identifier 226. The upper four bits of source identifier 200, which includes type field 202, reserved field 208, and agent identifier field 204 may correspond to the upper four bits of source identifier 220, which includes type field 202 and the upper three bits of agent identifier 224.

When a scannable mode register is set to one value for a first mode, source identifiers 200 are used that are formatted for one system bus, and when the scannable mode register is set to another value for a second mode, source identifiers 220 are used that are formatted for another system bus.

Figure 3A:
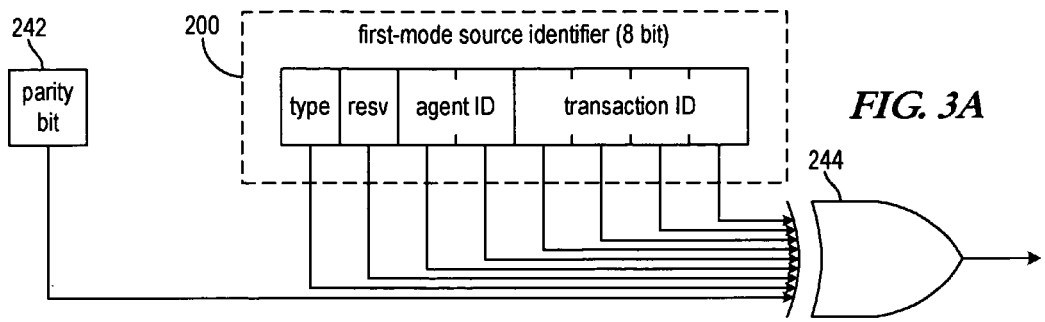
FIG. 3A and FIG. 3B are block diagrams of example parity checking circuits for source identifiers in accordance with various embodiments of the invention.
Figure 3B:
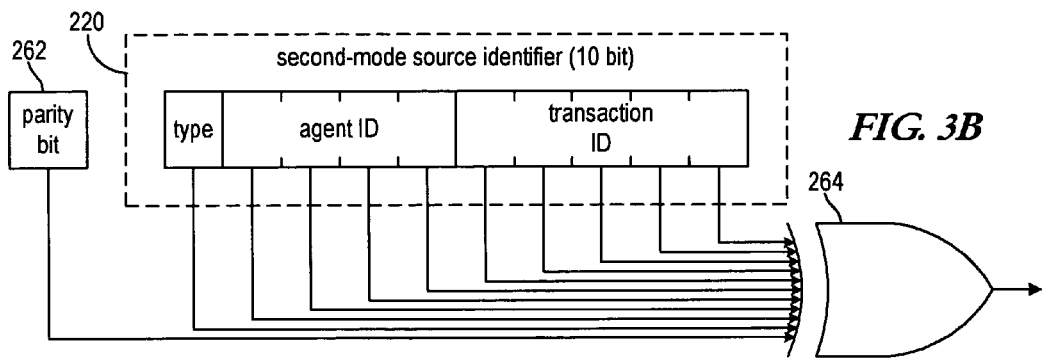

FIG. 3A and FIG. 3B are block diagrams of example parity checking circuits for source identifiers in accordance with various embodiments of the invention. Referring to FIG. 3A, source identifier 200 is protected by parity bit 242. When source identifier 200 is driven onto a system bus, the driver of the source identifier 200 may generate the parity bit 242 and drive the parity bit 242 along with the source identifier 200. A receiver from the system bus of the source identifier 200 and parity bit 242 may have an XOR gate 244 that calculates the exclusive-or of the bits of the source identifier 200 and the parity bit 242. If the output of XOR gate 244 indicates improper parity, then corruption of the source identifier 200 or parity bit 242 is detected and appropriate action may be taken by the computer system. It will be appreciated that parity bit 242 may be generated at the driver of the source identifier using an XOR gate similar to XOR gate 244 that has one less input by omitting the input from the parity bit 242. In addition, XOR gate 244 may be a tree of XOR gates, such as two-input XOR gates. Referring to FIG. 3B, parity is similarly checked for source identifier 220 using parity bit 262 and XOR gate 264.

Figure 3C:
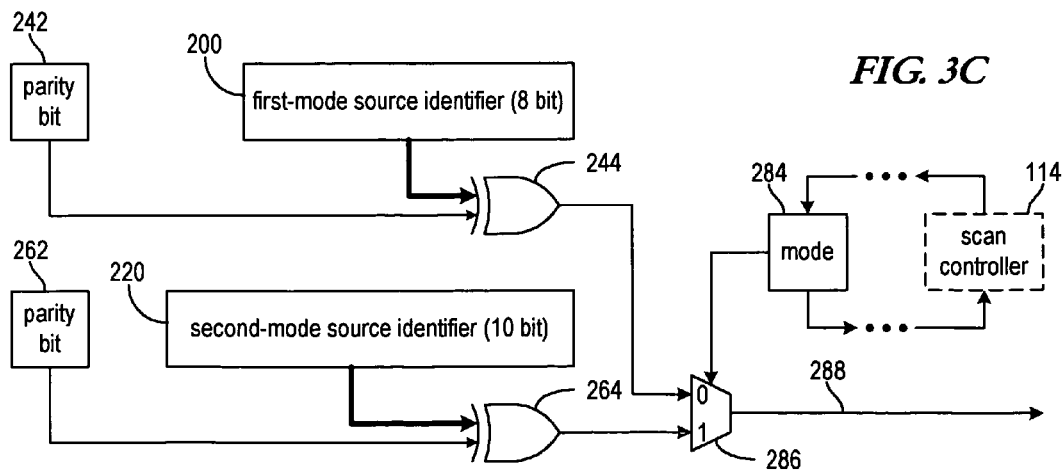
FIG. 3C is a block diagram of an example circuit for parity checking source identifiers in first and second modes in accordance with various embodiments of the invention.

FIG. 3C is a block diagram of an example circuit for parity checking source identifiers in a first and second modes in accordance with various embodiments of the invention. A scan controller 114 sets the value of the scannable mode register 284 using a serial scan chain. Scannable mode register 284 may control a two-input multiplexer 286 having one input connected to the output of XOR gate 244 and the other input connected to the output of XOR gate 264. Depending on the value of the scannable mode register 284, the output on line 288 of multiplexer 286 indicates the parity of a source identifier 200 in a first mode, for a system bus having format 200 for the source identifier, or in second mode, for a system bus having format 220 for the source identifier. It will be appreciated that simpler mode-dependent parity checking circuits for source identifiers may be used when the signals corresponding to source identifiers 200 and 220 are implemented using overlapping signals.

Figure 4:
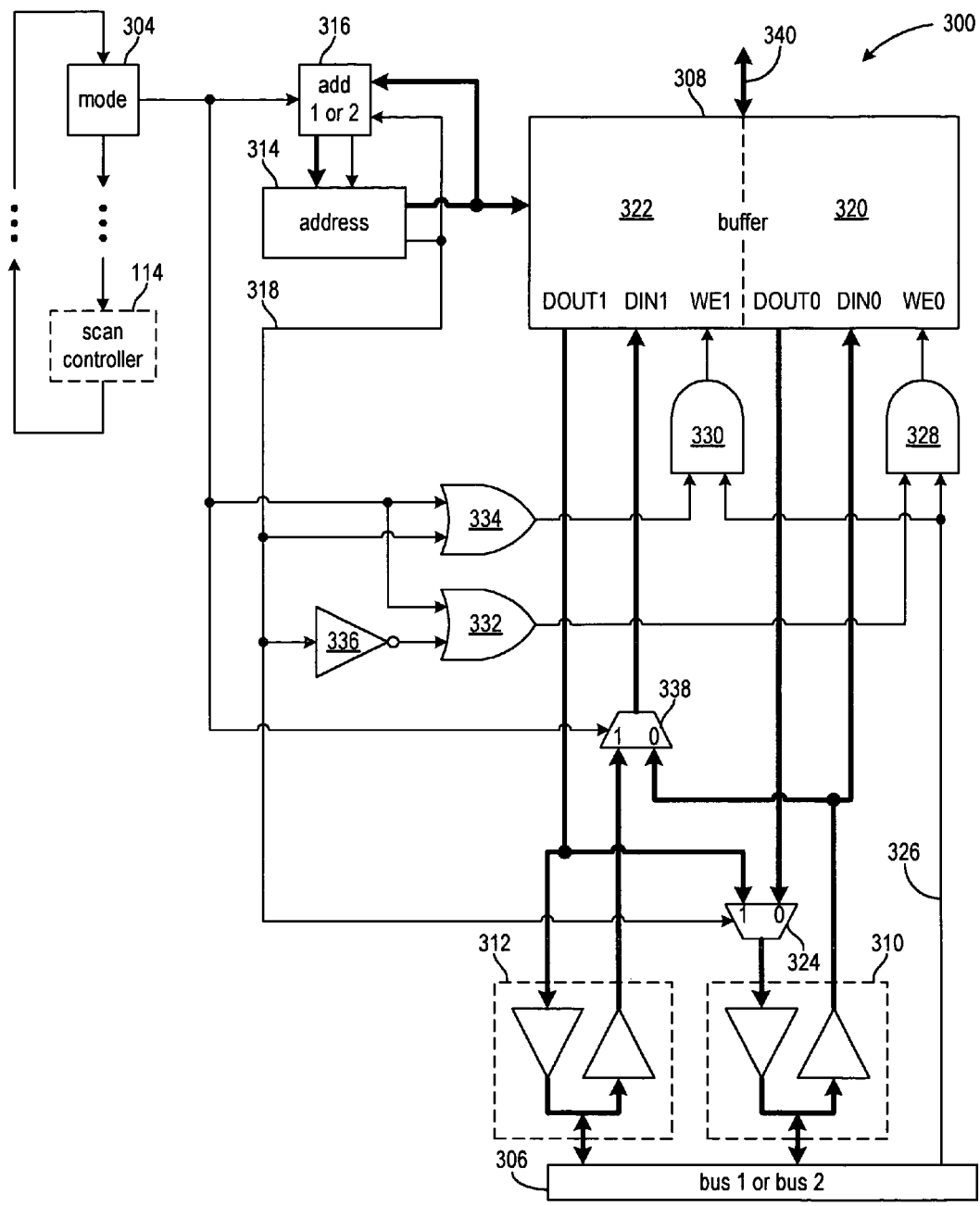
FIG. 4 is a block diagram of the datapath for an example interface unit in accordance with various embodiments of the invention.

FIG. 4 is a block diagram of the datapath 300 for an example interface unit in accordance with various embodiments of the invention. A scan controller 114 external to datapath 300 sets the value of the scannable mode register 304 using a serial scan chain. Data is transferred between the datapath 300 and the system bus 306 in either narrow mode or wide mode depending on the value in the scannable mode register 304.

In a system with a narrow system bus 306, data is transferred between the narrow system bus 306 and the buffer 308 using only transceiver 310, while in a system with a wide system bus 306, data is transferred between the wide system bus 306 and the buffer 308 using both transceivers 310 and 312 in parallel. Data is transferred between a system bus 306 and a location in buffer 308 determined by the value of address register 314.

In a system with the protocol for the system bus supporting a narrow system bus 306, the corresponding value of zero for scannable mode register 304 causes adder 316 to increment the address register 314 by one during a data transfer. Successive cycles of transferred data alternate between halves 320 and 322 of buffer 308, under control of the least significant bit on line 318 of the address register 314. For a data transfer from the datapath 300 to the system bus 306, multiplexer 324 selects data from alternating halves 320 and 322 of buffer 308 under control of the least significant bit on line 318 of the address register 314. For a data transfer from the system bus 306 to the datapath 300, the system bus 306 may provide a data valid signal on line 326 that is converted into alternating write enables for halves 320 and 322 of buffer 308 by AND gates 328 and 330, OR gates 332 and 334, and inverter 336. In addition, the value of zero for scannable mode register 304 in narrow mode causes multiplexer 338 to direct data from transceiver 310 to half 322 of buffer 308.

In a system with the protocol for the system bus supporting a wide system bus 306, the corresponding value of one for scannable mode register 304 causes adder 316 to increment the address register 314 by two during a data transfer. For a data transfer from the datapath 300 to the system bus 306, multiplexer 324 always selects data from half 320 of buffer 308 because the value for line 318 is always zero. For a data transfer from the system bus 306 to the datapath 300, the data valid signal on line 326 is converted into parallel write enables for both halves 320 and 322 of buffer 308 by AND gates 328 and 330 because the outputs of OR gates 332 and 334 reflect the value of one for the scannable mode register 304. In addition, the value of one for scannable mode register 304 in wide mode causes multiplexer 338 to direct data from transceiver 312 to half 322 of buffer 308.

Buffer 308 may have one or more ports on lines 340 that permit logic external to the interface unit to access the data stored in buffer 308. Generally, the ports on lines 340 always access halves 320 and 322 in parallel, regardless of whether system bus 306 is narrow or wide. Thus, datapath 300 hides the width of the system bus 306 from this logic external to the interface unit.

It will be appreciated that circuitry similar to datapath 300 may be used for logging diagnostic information, such as a trace log of the system bus 306. A trace log may store data from a system bus 306 that is either narrow or wide, depending on the value of a scannable mode register 304.

Figure 5:
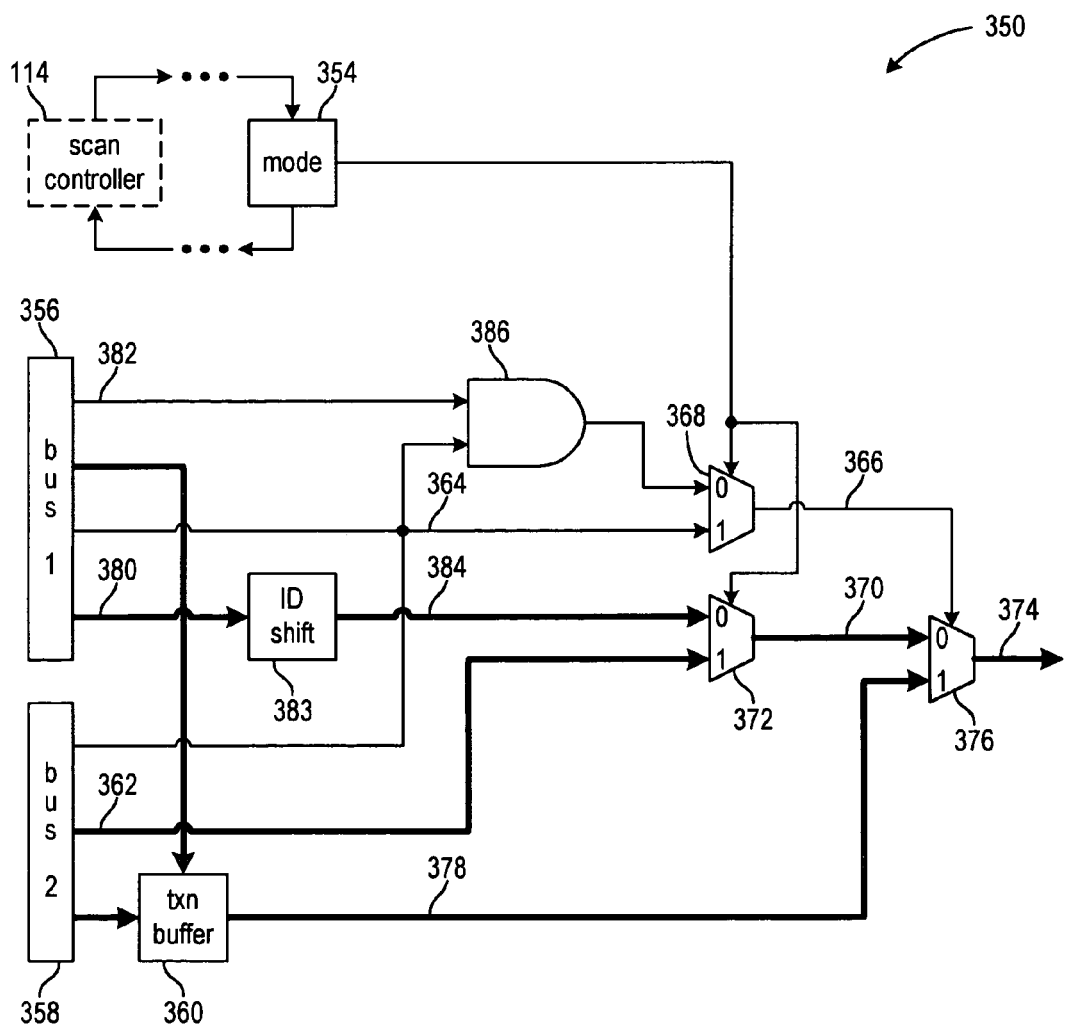
FIG. 5 is a block diagram of control logic for an example interface unit in accordance with various embodiments of the invention.

FIG. 5 is a block diagram of control logic 350 for an example interface unit such as interface unit 106 in accordance with various embodiments of the invention. A scan controller 114 external to control logic 350 sets the value of the scannable mode register 354 using a serial scan chain. It will be appreciated that scannable mode register 354, scannable mode register 284 of FIG. 3C, and scannable mode register 304 of FIG. 4 may be implemented using a shared storage bit or using separate storage bits. Certain differences in the protocols for system buses 356 and 358 that are related to the processing of source identifiers are managed by control logic 350.

The protocol for system bus 358 may always generate the source identifier at the originator of a transaction request. The source identifier is included in the transaction request by the originator and information from each transaction request is stored in the transaction buffer 360, including transaction requests issued onto system bus 358 by the interface unit that includes control logic 350. For instance, while the interface unit that includes control logic 350 issues a transaction request onto system bus 358, the source identifier included with that request is read from the bus by the interface unit and stored within the transaction buffer 360, as shown by FIG. 5. In another embodiment, this source identifier may be stored directly within transaction buffer 360 by control logic when the transaction request is driven onto the bus, and therefore this identifier need not be read back while the request is being driven onto the bus.

Sometime after the transaction request is issued, the destination on system bus 358 for the transaction request may issue a completion response that repeats the source identifier on lines 362, with the validity of lines 362 indicated by an active-low strobe on line 364.

A value of one for scannable mode register 354 may correspond to system bus 358 and cause the output on line 366 of multiplexer 368 to reflect the strobe on line 364. In addition, the value of one for scannable mode register 354 may cause the output on lines 370 of multiplexer 372 to reflect the repeated source identifier on lines 362 from the completion response. During a strobe on line 366 for a repeated source identifier from a completion response, the output on lines 374 of multiplexer 376 reflects the repeated source identifier on lines 370, and otherwise lines 374 reflect the source identifier on lines 378 from the transaction request.

Thus, the source identifier on lines 374 may be either a source identifier from a transaction request, or a source identifier from a completion response that repeats the source identifier from a prior transaction request. When the source identifier on lines 374 is from a transaction request that was locally originated by the interface unit including control logic 350, this source identifier may be retained for matching with a subsequent completion response. Type and agent fields in the source identifier on lines 374 with the format corresponding to the protocol for system bus 358 may be compared with the values of the type and agent fields of the processing arrangement including the interface unit to determine whether a transaction request was locally originated. When the source identifier on lines 374 is from a completion response, this source identifier may be compared with each of the retained source identifiers for pending transactions and matched with the appropriate transaction request. Data may be associated with the completion response and this data is routed to the appropriate destination within the interface unit when a match is found between the source identifier from the completion response and the source identifier from a locally originated transaction request.

The protocol for system bus 356 may generate the source identifier at the destination on system bus 356 of a transaction request for certain transactions, and at the originator on system bus 356 of a transaction request for other transactions. For example, the source identifier for memory reads may be generated at the destination of a controller for memory and input/output, and the source identifier for input/output transactions may be generated at the originator of the input/output transactions.

For a memory read, the controller for memory and input/output may supply the source identifier to system bus 356 twice: first in an acknowledgement response that indicates acceptance of the memory read by the controller for memory and input/output, and second in a completion response along with the data from memory that satisfies the memory read. In both cases, the controller for memory and input/output provides the source identifier on lines 380. The source identifier on lines 380 is validated by acknowledgement strobe on line 382 for the case of an acknowledgement response, and by the completion strobe on line 364 for the case of a completion response. It will be appreciated that the acknowledgement strobe on lines 382 may include multiple signals that encode the type of acknowledgement in addition to providing the acknowledgement strobe.

Shifter 383 converts the format of a source identifier for system bus 356, as illustrated in the example of FIG. 2A, into the format of a source identifier for system bus 358, as illustrated in the example of FIG. 2B. For example, the lower and upper four bits of an eight-bit source identifier on lines 380 may correspond respectively to the lower and upper four bits of a ten-bit source identifier on lines 384 and the center two bits of the source identifier on lines 384 may always have a value of zero. It will be appreciated that a source identifier included in a request transaction, an acknowledgement response, or a completion response may be correspondingly converted from a format for system bus 358 to a format for system bus 356 before the source identifier is driven onto system bus 356.

A value of zero for scannable mode register 354 may correspond to system bus 356 and cause the output on line 366 of multiplexer 368 to reflect the logical-or from AND gate 386 of the active-low acknowledgement strobe on line 382 and the active-low completion strobe on line 364. In addition, the value of zero for scannable mode register 354 may cause the output on lines 370 of multiplexer 372 to reflect the shifted source identifier on lines 384 from either the acknowledgement response or the completion response. During a strobe on line 366 for either the acknowledgement response or the completion response, the output on lines 374 of multiplexer 376 reflects the source identifier on lines 370, and otherwise lines 374 reflect the source identifier on lines 378 from the transaction request.

Thus, the source identifier on lines 374 may be a source identifier from a transaction request when the source identifier is generated at the originator of the transaction request, a source identifier from an acknowledgement response when the source identifier for the transaction request associated with the acknowledgement response is generated at the destination of the transaction request, or a source identifier from a completion response. When the source identifier on lines 374 is from a transaction request that was locally originated or an acknowledgement response associated with a transaction request that was locally originated, this source identifier may be retained for matching with a subsequent completion response. When the source identifier on lines 374 is from a completion response, this source identifier may be compared with each of the retained source identifiers for pending transactions and matched with the appropriate transaction request. Any data associated with the completion response is routed to the appropriate destination within the interface unit when a match is found for the source identifier from the completion response.

Transaction buffer 360 may be a FIFO buffer that stores multiple transaction requests received from a system bus 356 or 358. Transaction requests may receive acknowledgement responses in the order that the transaction requests are issued onto system bus 356 or 358. A transaction request may be removed from the transaction buffer 360 for each acknowledgement response on line 382, and the acknowledgement response may be associated with the removed transaction request. While acknowledgement responses are received in the order that the associated transaction requests are issued, completion responses may be received in any order. For example, a controller for memory and input/output may issue a completion response on system bus 356 or 358 for a memory read as soon as the data for the memory read has been obtained from memory and the memory read has been given an acknowledgement response, regardless of whether there are any prior memory reads that have not yet been given a completion response.

Figure 6:
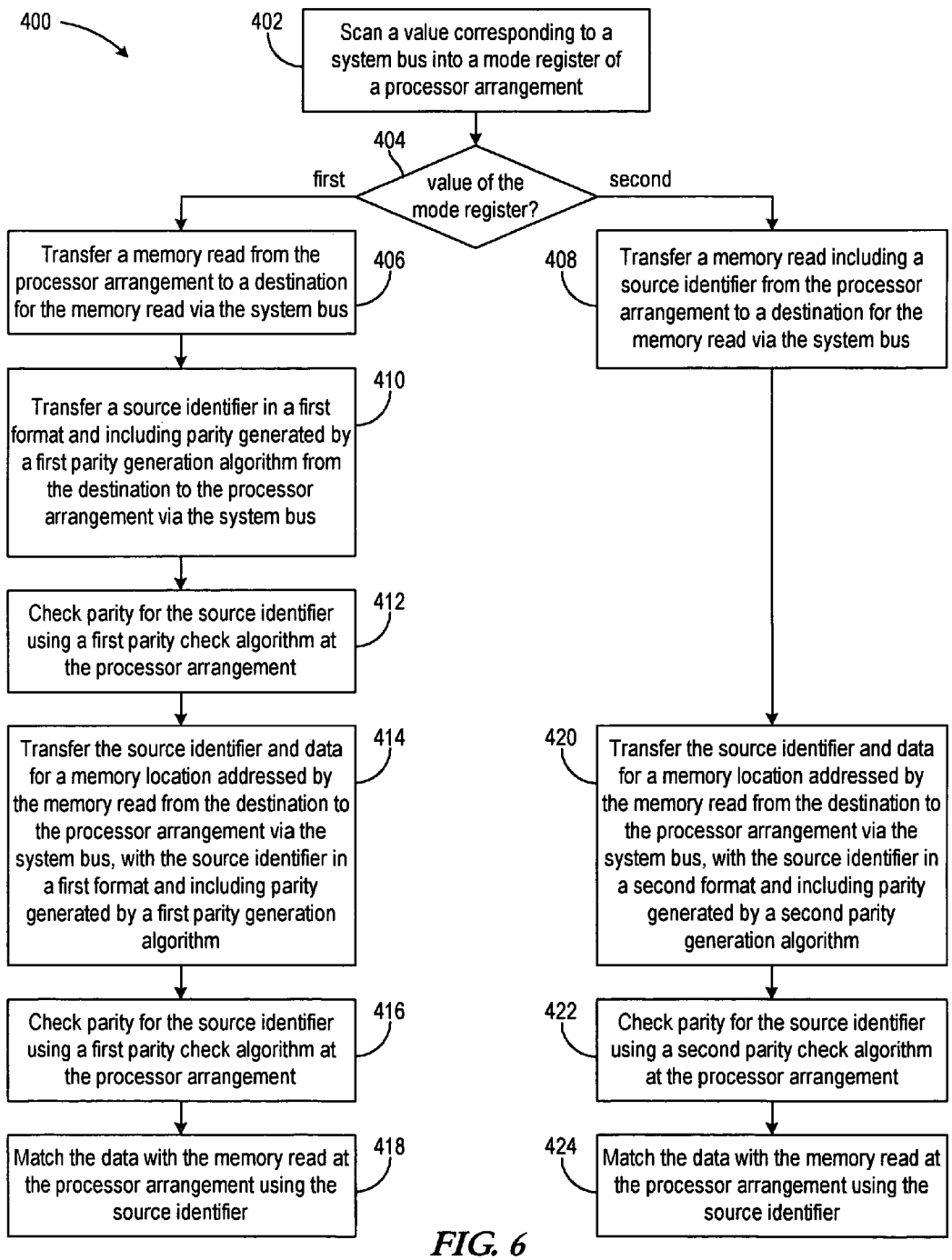
FIG. 6 is a flow diagram of an example process for transferring data in a computer system in accordance with various embodiments of the invention.

FIG. 6 is a flow diagram of an example process 400 for transferring data in a computer system in accordance with various embodiments of the invention. A memory read is issued by a processor arrangement and a destination for the memory read returns data for a memory location addressed by the memory read. The processor arrangement matches the data to the memory read based on a source identifier returned by the destination along with the data. The processing of the source identifier depends on a value for a mode register that reflects the type of system bus in the computer system.

At step 402, a scan controller may scan a value corresponding to the system bus of the computer system into a mode register of the processor arrangement. The system bus of the computer system may be either a first system bus or a second system bus and the value given to the mode register is a first value for a computer system with the first system bus or a second value for a computer system with the second system bus. At decision 404, the value of the mode register is checked by the processor arrangement to determine the protocol for handling of a memory read. For the first value of the mode register, process 400 proceeds to step 406 and for the second value of the mode register, process 400 proceeds to step 408.

At step 406, the processor arrangement issues the memory read onto the system bus. The protocol for the first system bus may have the destination for the memory read respond with an acknowledgement response including a source identifier in a first format and including parity generated by a first parity generation algorithm. Because the mode register has the first value, the processing arrangement may accept the transfer of the source identifier at step 410, and check the parity for the source identifier using a first parity check algorithm at step 412. The processing arrangement may associate the source identifier with the memory read and retain the source identifier. For example, a table of pending memory reads in a storage array of the processing arrangement may be updated with the source identifier at the table entry for the associated memory read.

Subsequently, the destination for the memory read may obtain the data for the memory location addressed by the memory read. For example, the data may be obtained from a memory resource, or the data may be obtained from a cache of a processing arrangement in another cell of the computer system. At step 414, the data for the memory read is transferred to the processing arrangement along with the source identifier in a completion response. Because the mode register has the first value, the processing arrangement may expect the source identifier to be in a first format and have parity generated by a first parity generation algorithm, and the processing arrangement may check the parity for the source identifier using a first parity check algorithm at step 416. At step 418, the data is matched with the pending memory read using the source identifier from the completion response. For example, the source identifier from the completion response may be compared with each of the source identifiers in a table of pending memory reads.

The protocol for the second system bus may generate the source identifier for a memory read at the originator of the memory read. At step 408, the memory read including a source identifier is issued by the processor arrangement. It will be appreciated that the memory read may include parity for the various fields of the memory read including the source identifier.

At step 420, the data for the memory read is transferred to the processing arrangement along with the source identifier in a completion response. Because the mode register has the second value, the processing arrangement may expect the source identifier to be in a second format and have parity generated by a second parity generation algorithm, and the processing arrangement may check the parity for the source identifier using a second parity check algorithm at step 422. At step 424, the data is matched with the pending memory read using the source identifier from the completion response.

In addition to the embodiments of the invention described above, other aspects and embodiments will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A computing system, comprising:
   a system bus that implements a bus protocol;
   an interface unit coupled to the system bus, wherein the interface unit is compatible with a first system bus protocol in a first selectable mode and a second system bus protocol in a second selectable mode, and the first system bus protocol is different from the second system bus protocol;
   at least one processor arrangement coupled to the system bus via the interface unit;
   a controller coupled to the system bus via an interface function compatible with one of the system bus protocols, the controller adapted to provide access to memory and input/output resources;
   a mode register coupled to the interface unit, wherein the interface unit selects the first selectable mode responsive to data in the mode register being equal to a first value and selects the second selectable mode responsive to the data in the mode register being equal to a second value; and
   a scan controller coupled to the mode register, the scan controller adapted to scan data into the mode register, whereby the interface unit provides access to the system bus for the at least one processor according to one of the first and second selectable modes.

2. The computing system of claim 1, wherein the scan controller is adapted to scan one of the first and second values into the mode register.

3. The computing system of claim 1, wherein the scan controller is adapted to scan into the mode register the first value responsive to the one of the system bus protocols of the controller being the first system bus protocol and the second value responsive to the one of the system bus protocols of the controller being the second system bus protocol.

4. The computing system of claim 3, wherein the first system bus protocol supports parallel transmission of a first number of bits, the second system bus protocol supports parallel transmission of a second number of bits, and the first number is different from the second number.

5. The computing system of claim 4, wherein the second width is twice the first width.

6. The computing system of claim 3, wherein the first system bus protocol supports a first operating frequency, the second system bus protocol supports a second operating frequency, and the first operating frequency is different from the second operating frequency.

7. The computing system of claim 3, wherein the first system bus protocol supports up to a first plurality of the processor arrangements, the second system bus protocol supports up to a second plurality of the processor arrangements, and the first plurality is different from the second plurality.

8. The computing system of claim 3, wherein the interface unit determines whether a transaction from the system bus is directed to the corresponding processor arrangement responsive to a source identifier included in the transaction and the value of the mode register.

9. The computing system of claim 8, wherein the interface unit determines a type field and an agent field of the source identifier according to a first format of the source identifier for the first value of the mode register and a second format of the source identifier for the second value of the mode register and to determine whether the transaction from the system bus is directed to the corresponding processor arrangement from the type field and the agent field.

10. The computing system of claim 8, wherein the transaction is a completion response for a request transaction issued by the corresponding processor arrangement.

11. The computing system of claim 3, wherein the interface unit is adapted to determine whether a transaction of the system bus was issued by the controller responsive to a source identifier included in the transaction and the value of the mode register.

12. The computing system of claim 3, wherein the interface unit is adapted to format a source identifier from the system bus responsive to the value of the mode register.

13. The computing system of claim 12, wherein the source identifier is included in one of an acknowledgement response from the system bus and a completion response from the system bus.

14. The computing system of claim 3, wherein the interface unit is adapted to check parity of a source identifier from the system bus responsive to the value of the mode register.

15. The computing system of claim 14, wherein the source identifier is included in one of an acknowledgement response from the system bus and a completion response from the system bus.

16. The computing system of claim 3, wherein the interface unit is adapted to determine a location in a data buffer to store data from a completion response responsive to the value of the mode register.

17. The computing system of claim 3, wherein the interface unit is adapted to log trace data reflecting operation of the interface unit responsive to the value of the mode register.

18. A method for transferring data in a computer system, comprising:
scanning a value into a mode register in an interface unit of a processor arrangement in the computer system, wherein the value is either a first value or a second value;
issuing a memory read to a system bus of the computer system by the interface unit;
receiving from the system bus by the interface unit, a completion response for the memory read, the completion response including a source identifier and data of a memory location addressed by the memory read;
checking parity of the source identifier by the interface unit using one of a first parity check and a second parity check, the one of the parity checks selected in response to the value in the mode register;
comparing by the interface unit, in response to a first value in the mode register, the source identifier in the completion response to a source identifier in an acknowledgement response associated with the memory read and conditioning acceptance of the data from the completion response in response to the comparison; and
comparing by the interface unit, in response to a second value in the mode register, the source identifier in the completion response to a source identifier in the memory read and conditioning acceptance of the data from the completion response in response to the comparison.

19. The method of claim 18 further comprising:
accepting by the interface unit in response to the first value of the mode register, the source identifier received in the acknowledgement response; and
checking parity of the source identifier received in the acknowledgement response using the first parity check algorithm in response to the first value of the mode register.

20. An arrangement for transferring data in a computer system, comprising:
means for setting a value in a mode register;
means for issuing a memory read to a system bus of the computer system;
means for receiving from the system bus, a completion response for the memory read, the completion response including a source identifier and data of a memory location addressed by the memory read;
means, responsive to a first value in the mode register and the source identifier in the completion response being equal to a source identifier in an acknowledgement response associated with the memory read, for receiving the data from the completion response; and
means, responsive to a second value in the mode register and the source identifier in the completion response being equal to a source identifier in the memory read, for receiving the data from the completion response.

21. The arrangement of claim 20, further comprising means, responsive to the value in the mode register, for selecting and performing either a first parity check or a second parity check of the source identifier.

* * * * *